April 27, 1926.

M. F. ROBISCHON 1,582,228

ATTACHMENT FOR OVERFLOW PIPES

Filed April 2, 1925

INVENTOR
Michael F. Robischon
BY Thomas L. Wilder
ATTORNEY

Patented Apr. 27, 1926.

1,582,228

UNITED STATES PATENT OFFICE.

MICHAEL F. ROBISCHON, OF UTICA, NEW YORK, ASSIGNOR OF ONE-HALF TO EDWARD E. ROBISCHON, OF UTICA, NEW YORK.

ATTACHMENT FOR OVERFLOW PIPES.

Application filed April 2, 1925. Serial No. 20,264.

*To all whom it may concern:*

Be it known that I, MICHAEL F. ROBISCHON, a citizen of the United States, residing at the city of Utica, in the county of Oneida and State of New York, have invented certain new and useful Improvements in Attachments for Overflow Pipes, of which the following is a specification, reference being had therein to the accompanying drawing.

My invention relates to an attachment for overflow pipes, and I declare the following to be a full, clear, concise and exact description thereof sufficient to enable anyone skilled in the art to which it appertains to make and use the same reference being had to the accompanying drawings in which like reference characters refer to like parts throughout the specification.

The object of the invention is to provide a device that will conserve the alcohol that is poured into the radiator of an automobile in cold or freezing weather. To this end there is attached in a removable manner to the lower open end of the overflow pipe, an automatic valve, whereby to prevent the escape of the alcoholic vapors by way of said pipe, that being the only possible outlet when the radiator cap is in place. The object will be understood by referring to the drawings in which.

Figure 1:
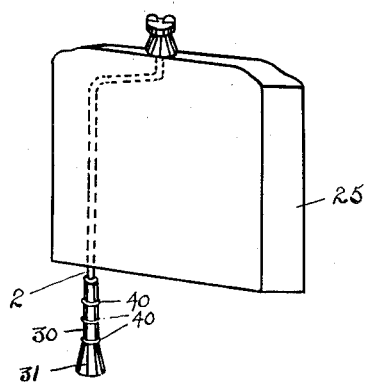
Fig. 1 is a perspective view of a radiator of an automobile showing an overflow pipe with the device attached thereto.
Figure 2:
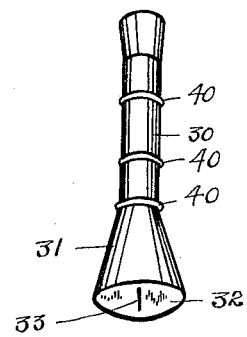
Fig. 2 is an enlarged detail view in perspective of the attachment.

Referring more particularly to the drawings, the device embodies a hollow rubber tube 30 having a slight tapering open upper end, whereby to aid in slipping the same over the lower open end of the overflow pipe 2 and a lower enlarged tapering end 31 that is closed by a diaphragm 32 formed integral therewith. Diaphragm 32 is equipped with a slit 33 that forms an air tight valve member to prevent the escape of the alcoholic vapors from radiator 25 except in the event of excess water in radiator 25 or abnormal pressure, when slit 33 will open automatically to relieve said pressure and immediately close thereafter.

Annular ribs 40 are formed on the exterior surface of rubber tube 30 to aid in pushing said tube upon the lower end of overflow pipe 2. Furthermore, the upper end of rubber tube 30 is flared outward to aid in pushing said tube 30 upon the lower end of overflow pipe 2.

The operation of the device is effected as follows: the upper free end of rubber tube 30 is slipped over the lower free end of overflow pipe 2, whereby to prevent the escape of any alcoholic vapors from the radiator 25. In the event that an excessive amount of water should be placed in said radiator or in the event the steam pressure should become abnormal, said excess would be allowed to escape by way of slit 33 which would, under the force created thereby, open automatically. Immediately the excess had escaped, slit 33 would close again automatically and thereby prevent any further escape of the alcoholic vapors from radiator 25.

Having thus described my invention what I claim as new and desire to secure by Letters Patent is:

1. In an attachment for overflow pipes, a flexible member adapted to be attached to said pipe, an enlarged tapering end carried by said flexible member, a diaphragm formed in said tapering end, and a slit in said diaphragm to automatically permit a discharge of the overflow.

2. In an attachment for overflow pipes, a removable flexible member adapted to be attached to said pipe, an enlarged part formed on said member, a diaphragm formed in said enlarged part, and a slit formed in said diaphragm, whereby to permit a discharge of the overflow.

3. In an attachment for overflow pipes, a removable flexible member adapted to be attached to said pipe, an enlarged tapering part made on said member, a diaphragm formed in said enlarged part, a slit made in said diaphragm, whereby to permit a discharge of the overflow, and means formed on the exterior of said flexible member to aid in mounting the same upon an overflow pipe.

4. In an attachment for overflow pipes, a removable flexible member adapted to be attached to said pipe, an enlarged tapering part made on said member, a diaphragm formed in said enlarged part, a slit made in said diaphragm, whereby to permit a discharge of the overflow, and ribs formed on the exterior of said flexible member to aid in mounting the same upon an overflow pipe.

In testimony whereof I affix my signature.

MICHAEL F. ROBISCHON.